3,072,621
POLYMERIZATION OF CONJUGATED
DIOLEFINES
Gottfried Pampus and Heinz Groene, Leverkusen, Germany, assignors to Farbenfabriken Bayer Aktiengesellschaft, Leverkusen, Germany, a corporation of Germany
No Drawing. Filed May 10, 1960, Ser. No. 27,988
Claims priority, application Germany May 22, 1959
11 Claims. (Cl. 260—83.7)

The present invention relates to a process for polymerizing 1,3-dienes.

It has long been known to polymerize hydrocarbons of the butadiene series with the aid of alkali metals to form products of high molecular weight. This process is or particular interest for the polymerization of isoprene by using lithium, since it is possible in this way to obtain a polyisoprene with a substantially uniform structure, i.e. polyisoprene in which the monomer units are predominantly linked in the 1,4-position and are present in the cis-configuration. A polyisoprene of this structure corresponds substantially to natural rubber as regards its physical, chemical and technological properties and is consequently of great technical importance.

The polymerization of hydrocarbons of the butadiene series with alkali metals has the disadvantage that the catalyst only becomes active after a latent period, the duration of which depends very largely on factors which are very difficult to realize and reproduce. On the other hand, once the polymerization has started, it frequently proceeds so violently that controlled heat dissipation can no longer be successfully effected and polymers of low quality are obtained. Consequently, considerable difficulties are involved when this process is carried out technically.

Alkali organometallic compounds such as sodium or lithium alkyl have also been used as catalysts for the polymerization of conjugated diolefines. When using such catalysts, the polymerization is almost instantaneously started and the progress of the reaction can be more easily controlled. However, even then, there are only obtained polymers which have sufficiently high molecular weights and thus also yield vulcanizates with high-grade technological properties if the catalysts are used in very low concentration. However, this requires an exceptionally high degree of purity of the monomers, which can only be obtained with great expense.

It has now been found that the polymerization of 1,3-dienes can be effected without the aforesaid difficulties by using catalysts which are formed by reaction of alkali metals and/or alkali metal compounds with halogenated hydrocarbons in the presence of graphite, the use of lithium and lithium compounds being of special interest in view of the preparation of catalysts for stereospecific polymerization.

Both the free alkali metals, such as for example metallic lithium, sodium or potassium, as well as compounds thereof known per se, which are capable to react with the halogenated hydrocarbons under formation of the respective alkali metal halides, can be used for the preparation of the catalysts according to the invention.

Examples are inorganic compounds such as the hydrides, oxides, hydroxides, amides of alkali metals (sodium hydride, lithium hydride, lithium-aluminium hydride, sodium oxide, lithium hydroxide, sodium amide) as well as organic compounds such as alkyl, alkenyl, cycloalkyl, aralkyl, aryl alkali metal compounds, the organic radicals of which contain 1 to 20 carbon atoms (methyl-, ethyl-, butyl-, hexyl-, n-octadecyl-, phenyl-, tolyl-, allyllithium and the coresponding sodium and potassium compounds), furthermore sodium dialkylamides and lithium diarylamide (sodium dibutylamide, lithiumdiphenylamide).

Halogenated hydrocarbons suitable for the present process are saturated or unsaturated mono- or polyhalogen compounds of the aliphatic series of straight-chain or branched nature, such as for example ethyl bromide, isopropyl bromide, n-butyl chloride, isoamyl bromide, isoamyl iodide, stearyl chloride, vinyl chloride, allyl chloride, 1,4-dibromobutane, and also cycloaliphatic halides such as cyclohexyl chloride, as well as araliphatic halides, such as for example benzyl chloride and benzal chloride and aromatic monohalogen or polyhalogen compounds such as bromobenzene, iodobenzene, chlorobenzene, 1,4-dibromobenzene,1-bromonaphthalene. It is, of course, possible to use mixtures of the recited alkali metals and/or the reactive alkali metal compounds with mixtures of the recited halogenated hydrocarbons for the production of the present catalysts.

By graphite within the terms of the present invention, there are understood forms of carbon such as more fully described by A. F. Holleman and E. Wibert: "Lehrbuch der anorganischen Chemie," 34th to 36th edition, Berlin, 1955, pages 296 to 298. As examples of these, there are mentioned products which are formed by heating carbonaceous substances at low temperatures, such as wool charcoal, animal charcoal, bone charcoal, blood charcoal, sugar charcoal, thermal black, gas black, oil black, furnace black, channel black, acetylene black, naphthalene black, or those which are formed at higher and high temperatures, such as coke, lustrous carbon, retort graphite or synthetic graphite. Natural graphite can also be used. In fact forms of carbon which can be prepared in various ways by processes known per se so as to have different absorption power and degree of dispersion, as well as different reactivity. The said types of graphite can moreover be used in a form with an acid or alkaline reaction.

In accordance with one preferred form of the preparation of the catalysts according to the invention, first of all a dispersion of alkali metal and a graphite in the weight ratio of advantageously 1:5 to about 1:50 is prepared in an inert anhydrous hydrocarbon, such as for example pentane, hexane, petroleum ether, cyclohexane, benzene, toluene xylene, in an inert, preferably a rare gas or nitrogen atmosphere. The inert solvent is preferably applied in amounts of 5 to 500 parts by weight per one part by weight of alkali metal. Instead of the alkali metal there may be also used the above-cited alkali metal compounds. It is advisable in this connection to use the graphite in finest possible divided form in order to avoid a deposition during the production of the catalyst and during the polymerization. Particularly effective catalysts are obtained when the graphite is subjected to a drying process prior to the preparation of the catalyst. In order to produce best possible properties, it is essential to adapt the drying conditions to the type of graphite actually being used. It can moreover be advantageous to subject the graphite, prior to the production of the catalyst, to a treatment with an organic solvent, i.e. to extract it for example by shaking at room temperature or boiling under reflux with an organic solvent.

The dispersion thus obtained is mixed in an inert gas atmosphere with the halogenated hydrocarbon, preferably by slowly adding it to the halogenated hydrocarbon at temperatures from —20 to +100° C., preferably —10° up to +50° C., in such a quantity that at least one, preferably 1 to 4, alkali metal atoms are present per halogen atom. Metallic lithium is preferably used for this process. The dispersion hereby formed can be stirred for a time (such as 0.5 to 5 hours) at temperatures of about 0° to 100° C. in order to complete the reaction. During the reaction at least part of the alkali metal or alkali metal compound is transformed into the corresponding alkali metal halide, whereby a dispersion of deep blue to black color is formed which may be ascertained by carrying through the reaction in absence or graphite. The efficacy of the catalyst can be varied within wide limits by the nature of the composition and also by modifying the manufacturing conditions.

The present catalysts are suitable for the polymerization and copolymerization of 1,3-dienes having up to 10 carbon atoms, such as butadiene, 1-methyl butadiene, 2-methyl butadiene, 2,3-dimethyl butadiene, 2-ethyl butadiene, 2-phenyl butadiene, 2-chlorobutadiene. Mixtures of these monomers such as butadiene and isoprene can, of course, also be used for the polymeribation. Furthermore, it is possible to copolymerize the aforementioned dienes with monovinyl substituted aromatic hydrocarbons, such as styrene, vinyltoluene, α-methylstyrene, whereby these latter components are applied in amounts of about up to 40 percent by weight as calculated on the total monomers.

The monomers to be used for the polymerization should beforehand be purified in accordance with conventional known physical or chemical purifying processes, such as for example fractional distillation, heating with alkali metals, organometallic compounds, aluminium oxide, silica gel and other active adsorbents, heavy metal salts and the like, in order substantially to remove those compounds which would in foreseeable manner lead to a deactivation of the catalyst system.

The catalyst concentration is generally so adjusted that about 0.01 to 1.0 part by weight of alkali metal are present per 100 parts by weight of monomer.

The polymerization is preferably carried out with exclusion of atmospheric oxygen and moisture in an inert atmosphere, such as nitrogen, helium, argon, hydrocarbon vapors and the like. Polymerization can take place in block form and also in solution. Suitable solvents and diluents are saturated hydrocarbons, such as propane, butane, pentane, hexane and also mixtures of such hydrocarbons, such as for example petroleum ether. Kerosene, diesel oil, paraffin oil and cycloaliphatic hydrocarbons such as cyclohexane and aromatic hydrocarbons such as benzene, toluene, xylene can also be used for the same purpose. The reaction temperature is preferably not higher than +90° C. and is advantageously —10° to +60° C. The pressure conditions are not critical for the progress of the polymerization. It is possible to work at atmospheric pressure, and also at reduced or elevated pressures. The polymerization is advantageously caused to proceed at pressures such as those given at the reaction temperatures being used by the vapor pressures of the monomers and solvents being employed.

After completing the polymerization, the polymer is obtained as a solid mass where no solvent has been used or as a viscous solution when a solvent has been used. By treatment with alcohols, acetone, alcohol/water and acetone/water mixtures, if necessary in the presence of inorganic or organic acids, the polymer can be precipitated, the reactive alkali metal compounds being simultaneously deactivated and removed. When working up, it is preferred to add stabilizers and anti-oxidizing agents, such as phenyl-β-naphthylamine. N,N'-diphenyl-p-phenylene-diamine, di-tert.-butyl-p-cresol, di-tert.-butyl hydroquinone, tris-(nonylphenyl)-phosphite and the like in order to avoid an oxidation of the sensitive polymer and thus the premature degradation thereof. However, it is also possible to add substances immediately after completion of the polymerization which deactivate the catalyst, such as for example organic acids, and thereafter to incorporate stabilizers and anti-oxidizing agents, the solvent being removed in a suitable apparatus, such as for example a kneader or a worm. The drying of the stabilized polymerization products can be effected in air or in vacuo at normal or elevated temperatures.

The polymerization by means of the catalysts which have been described can take place intermittently or continuously. Suitable fc the intermittent process are bottles, stirrer-type vessels and autoclaves with which it is possible to work under inert conditions. A worm has proved suitable for the continuous process, and it has proved to be desirable to connect an initial polymerization vessel before the worm in order to keep the residence time in the worm member proper as short as possible.

In contrast to the known processes, no latent periods or only extremely short latent periods occur when using the catalysts according to the invention. Another essential advantage of the process described herein is that the polymerization proceeds uniformly, even when using relatively large batches, and can be controlled without the use of expensive equipment. The polymers produced by the present process have very high molecular weights, i.e. such as could only otherwise be produced by means of the known catalysts which are difficult to control as regards their latent period. In accordance with the process, it is for example readily possible to prepare polymers with an intrinsic viscosity of $[\eta]=7$. The proportion of gel in these polymers is very small.

As compared with the use of rare gases when employing metallic lithium, the possibility of using nitrogen as inert gas during the polymerization provides a considerable technical advance.

The danger of the molecular weights being lowered by excessive supply of the catalysts is moreover considerably reduced, since the maximum concentration thereof is not by any means as critical as it is with the hitherto known alkali organometallic catalysts.

The polymerisation of isoprene with lithium-containing catalysts of the type described yields polyisoprenes are obtained which are found by infra-red spectroscopic investigation to be more than 90% linked in the 1,4-cis-arrangement.

The polymers obtained by the process described can be worked by the conventional methods into elastic products with good technological properties, i.e. they can for example be vulcanized by adding usual fillers, pigments, stabilizers and age resisters. Particular technical importance is attributed to the isoprene polymers produced in this way, which can in known manner be worked into vulcanizates which show the advantageous properties of natural rubber, more especially a low hysteresis and also a high elasticity and tensile strength with a low degree of hardness.

The parts indicated in the following examples are parts by weight, unless otherwise indicated. Furthermore, in the following experiments, the corresponding catalysts are prepared in a rare gas atmosphere, whereas the polymerization is conducted under nitrogen.

*Example 1*

15 parts of finely powdered wood charcoal dried at 300° C. are stirred with 0.6 part of lithium and 20.0 parts of paraffin oil. 10.22 parts of stearyl chloride are thereafter slowly added dropwise. The dispersion is stirred for another 2 hours at 35° C.

6.0 parts of the catalyst suspension prepared in this way are introduced into 100.0 parts of isoprene, which is dried and purified by treatment with activated aluminium oxide. The reaction vessel is then heated to 50° C. Polymerization starts after a few minutes and is practically completed after 14 hours. A viscous polymer is obtained which is washed with acetone/water for destroying the catalyst and is stabilized with N,N'-diphenyl-p-phenylene diamine. The yield is 94% of the theoretical. The proportion of polymer with a 1,4-cis-structure is 95.2% according to the infra-red spectrum.

*Example 2*

40 parts of natural graphite are extracted with acetone and dried at 120° C. The graphite thus pretreated is then finely dispersed with 0.65 part of lithium by vigorous stirring in 45.0 parts of petroleum ether. 4.87 parts of n-butylbromide are slowly added dropwise at 0° C. and stirring is continued for 1 hour at 25° C. after the reaction subsides.

13.5 parts of the catalyst dispersion are introduced with exclusion of air and moisture into 100.0 parts of isoprene, which had been distilled beforehand over sodium. Polymerization soon commences at 60° C. and proceeds very uniformly, being stopped after 8 hours. The highly viscous polymerization product is treated with a mixture of isopropanol, water and acetic acid for destroying the catalyst and thereafter is stabilized by adding phenyl-β-naphthylamine. 69.0 parts of polymer are obtained, this having a [η] value of 7.3. The proportion of polymer with a 1,4-cis-structure is 94.2% according to infra-red spectroscopic examination.

*Example 3*

25.0 parts of carbon black with a pH value of 9.0 are dried at 400° C. and thereafter suspended in 50.0 parts of cyclohexane with 1.25 parts of lithium. 7.4 parts of n-butyl chloride are added dropwise at 20° C. and the dispersion is stirred for another hour at 45° C. The catalysts suspension is then stirred with 500.0 parts of isprene purified as in Example 1 and 2000.0 parts of cyclohexane in an autoclave. At a temperature of 45° C., polymerization is practically completed after 13 hours. The viscous mass is first of all treated with a 1% solution of tert.-butyl pyrocatechol in acetone/water and thereafter washed with acidified water, additional stabilizer being incorporated. The material dried in vacuo has a [η] value of 10.8, a proportion of polymers with 1,4-cis-structure of 93.9% and a gel content of 2.3%. The yield is 482.0 parts of polyisoprene.

The polymer prepared according to Example 3 was vulcanized for 5 minutes at 151° C. in accordance with the following specifications:

| | Parts |
|---|---|
| Polyisoprene | 100.0 |
| Carbon black (inactive) | 30.0 |
| Zinc oxide (active) | 5.0 |
| Phenyl-α-naphthylamine | 2.0 |
| Stearic acid | 1.0 |
| Paraffin | 0.6 |
| Accelerator | 0.7 |
| (0.5 part of dibenzthiazyl disulphide +0.2 part of diphenyl guanidine), and | |
| Sulphur | 2.5 |

The vulcanizate had the following properties:

| | |
|---|---|
| Tensile strength | 170 kg/cm.³ |
| Elongation | 910% |
| Rebound elasticity, 25° C | 68% |
| Elasticity, 75° C | 71% |
| Hardness, 25° C | 45° Shore |
| Notch toughness | 16 kg. abs |

*Example 4*

25 parts of carbon black with a pH of 9.0 are dried at 400° C. and thereafter suspended in 50 parts of n-hexane together with 1.25 parts of lithium. After adding 7.4 parts of n-butyl-chloride at 20° C. the mixture is stirred for one hour at 50° C. The catalytic suspension then obtained is mixed with 400 parts of butadiene and 1200 of n-hexane in an autoclave which has been rinsed with argon and then heated to 50° C. Polymerization is interrupted after 12 hours. The viscous mass obtained is precipitated with alcohol containing 2 percent of phenyl-β-naphthylamine and 3 percent of acetic acid. The isolated polybutadiene has the (η) value of 5.5 and a proportion of 1,4-structure of 87 percent. Yield: 368 parts.

*Example 5*

The catalyst described in Example 4 is mixed with a mixture of 200 parts of butadiene and 200 parts of isoprene and 1200 parts of n-hexane in an autoclave which has been rinsed with argon, and then heated to 50° C. After 12 hours polymerization is interrupted. The viscous material is treated with alcohol containing 2 percent of phenyl-β-naphthylamine and 3 percent of acetic ester. The isolated copolymer has an (η) value of 6.02. Yield: 370 parts.

*Example 6*

The catalyst described in Example 4 is pressed into an autoclave the air has been removed from by means of nitrogen together with 150 parts of isoprene and 50 parts of styrene. The mixture is heated for 8 hours to 50° C. The copolymer obtained is treated with alcohol containing 2 percent acetic acid and is stabilized with 1 percent of phenyl-β-naphthylamine. After drying in vacuo at 50° C. 186 parts of an isoprene-styrene copolymer having an (η) value of 5.9 are obtained.

*Example 7*

A mixture of 9 parts of furnace black, 0.8 part of lithium and 3.5 parts of isoamylbromide in 80 parts of petrol ether is reacted for 90 minutes. 70 parts of 2-chlorobutadiene-1,3 are thereafter distilled into the catalytic solution. The reaction mixture is heated to 60° C. After 10 hours polymerization is interrupted. A solution of 3 parts of phenyl-β-naphthylamine in 400 parts of acetone is added to the mixture, the precipitated, crumbly polymer is filtered off and washed neutral with water. Drying is carried through at 50° C. in vacuo. There are obtained 47 parts of a solid tough polymer.

We claim:

1. In a process for the polymerization of 1,3-dienes having 4 to 5 carbon atoms by contacting said 1,3-diene in an inert liquid medium under an inert gas atmosphere and at a temperature not exceeding 90° C. with a catalyst dispersion containing lithium in proportions such that about 0.01 to 1.0 part by weight of lithium are present per 100 parts by weight of monomer, the improvement which comprises using a catalyst dispersion which is obtained by reacting finely dispersed metallic lithium, under an inert gas atmosphere and in an inert organic solvent containing dispersed therein about 5 to 50 parts by weight per 1 part by weight of lithium of a finely dispersed carbonaceous substance having hexagonal crystalline lamellae, with a halogenated hydrocarbon in such an amount that more than one lithium atom is present per each halogen atom of said halogenated hydrocarbon, to produce lithium halide from said halogenated hydrocarbon and said metallic lithium.

2. A process according to claim 1, wherein said reaction between said halogenated hydrocarbon and said metallic lithium is carried out at temperatures beween −20 and +100° C.

3. A process according to claim 1, wherein said halogenated hydrocarbon is a member selected from the group consisting of aliphatic hydrocarbon chlorides, bromides and iodides having 1 to 20 carbon atoms.

4. A process according to claim 1, wherein said reaction between said halogenated hydrocarbon and said metallic lithium is carried out while first forming a dispersion of said metallic lithium and said carbonaceous substance in said inert organic solvent and thereafter contacting said dispersion with said halogenated hydrocarbon.

5. A process according to claim 3, wherein said halogenated hydrocarbon is butyl chloride.

6. A process according to claim 3, wherein said halogenated hydrocarbon is butyl bromide.

7. A process according to claim 1, wherein said carbonaceous substance is carbon black.

8. A process according to claim 1, wherein said 1,3-dienes are employed together with a monovinyl aromatic hydrocarbon of the benzene series to form copolymers of said monomers, said monovinyl aromatic hydrocarbons being applied in amounts of up to about 40 percent by weight as calculated on the total monomers.

9. A process for the preparation of a catalyst suitable for the polymerization of conjugated diolefines which comprises reacting finely dispersed metallic lithium, under an inert gas atmosphere and in an inert organic solvent containing dispersed therein about 5 to 50 parts by weight per 1 part by weight of lithium of finely dispersed carbon black, with an alkyl halide selected from the group consisting of alkyl chlorides and alkyl bromides, said metallic lithium being used in such amounts that about 1 to about 4 lithium atoms are present per each halogen atom of said alkyl halide, said reaction being carried out at temperatures between about −20 to +100° C.

10. Process according to claim 9, wherein said alkyl halide is butyl chloride.

11. Process according to claim 9, wherein said alkyl halide is butyl bromide.

References Cited in the file of this patent

UNITED STATES PATENTS

| 2,483,886 | Crouch | Oct. 4, 1949 |

FOREIGN PATENTS

| 817,693 | Great Britain | Aug. 6, 1959 |

OTHER REFERENCES

Emmet, P. H.: "Catalysis," Fundamental Principles (Part 1), vol. I, pp. 245–272, Reinhold Publishing Corp., New York, 1954.